United States Patent
Visvanathan et al.

(10) Patent No.: US 10,289,307 B1
(45) Date of Patent: May 14, 2019

(54) METHOD FOR HANDLING BLOCK ERRORS ON A DEDUPLICATED STORAGE SYSTEM

(71) Applicant: EMC IP Holding Company LLC, Hopkinton, MA (US)

(72) Inventors: Satish Visvanathan, San Jose, CA (US); Mahesh Kamat, San Jose, CA (US); Rahul B Ugale, Santa Clara, CA (US); Ganesh Rajagopalan, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/080,499

(22) Filed: Mar. 24, 2016

Related U.S. Application Data

(63) Continuation-in-part of application No. 14/586,184, filed on Dec. 30, 2014.

(51) Int. Cl.
*G06F 3/06* (2006.01)

(52) U.S. Cl.
CPC ............ *G06F 3/061* (2013.01); *G06F 3/0641* (2013.01); *G06F 3/0659* (2013.01); *G06F 3/0679* (2013.01)

(58) Field of Classification Search
CPC ....................... G06F 12/0246; G06F 17/30156
USPC ......................................................... 707/747
See application file for complete search history.

(56) References Cited

U.S. PATENT DOCUMENTS

| | | | |
|---|---|---|---|
| 6,067,547 A | 5/2000 | Douceur | |
| 6,427,195 B1 * | 7/2002 | McGowen | G06F 9/5016 711/153 |
| 7,502,954 B1 * | 3/2009 | Strickland | G06F 11/1662 714/10 |
| 8,161,236 B1 * | 4/2012 | Noveck | G06F 17/30132 711/113 |
| 8,392,384 B1 | 3/2013 | Wu et al. | |
| 8,478,799 B2 | 7/2013 | Beaverson et al. | |
| 8,732,403 B1 * | 5/2014 | Nayak | G06F 3/0641 711/135 |
| 8,806,115 B1 | 8/2014 | Patel et al. | |
| 8,838,887 B1 | 9/2014 | Burke et al. | |
| 8,892,938 B1 | 11/2014 | Sundaram et al. | |
| 9,043,555 B1 | 5/2015 | Khona et al. | |
| 9,047,189 B1 * | 6/2015 | Gupta | G06F 11/10 |
| 9,116,848 B1 | 8/2015 | Jordan et al. | |
| 9,390,116 B1 | 7/2016 | Li et al. | |

(Continued)

OTHER PUBLICATIONS

Debnath, Biplob , et al., "'ChunkStash: Speeding up Inline Storage Deduplication using Flash Memory,'", *USENIX annual technical conference*, 2010., (2010), 1-15.

(Continued)

*Primary Examiner* — Mohammad S Rostami
(74) *Attorney, Agent, or Firm* — Womble Bond Dickinson (US) LLP

(57) ABSTRACT

A method, article of manufacture, and apparatus for maintaining a cache index inside a deduplicated storage system is discussed. A block allocation is requested from a persistent storage device, wherein the block allocation comprises a logical block for storing data. The logical block is determined to be unavailable. A next sequential block is requested from the persistent storage until an available logical block is located, the available logical block satisfying the block allocation. Data comprising a plurality of buckets is written to the available logical block.

6 Claims, 16 Drawing Sheets

(56) References Cited

U.S. PATENT DOCUMENTS

| | | | |
|---|---|---|---|
| 9,430,164 B1 | 8/2016 | Botelho et al. | |
| 2002/0156973 A1* | 10/2002 | Ulrich | G06F 9/5083 711/114 |
| 2008/0235471 A1* | 9/2008 | Feldman | G06F 1/30 711/162 |
| 2008/0235489 A1* | 9/2008 | Gorobets | G06F 12/0246 711/217 |
| 2008/0275847 A1 | 11/2008 | Chellapilla | |
| 2009/0158000 A1* | 6/2009 | Takahashi | G06F 9/445 711/202 |
| 2009/0259882 A1* | 10/2009 | Shellhamer | G06F 11/1076 714/6.32 |
| 2010/0169287 A1 | 7/2010 | Klose | |
| 2010/0199027 A1 | 8/2010 | Pucheral et al. | |
| 2010/0217953 A1 | 8/2010 | Beaman et al. | |
| 2010/0276781 A1 | 11/2010 | Smith et al. | |
| 2010/0318587 A1* | 12/2010 | Seet | G06F 17/30306 707/791 |
| 2011/0017052 A1 | 1/2011 | Falck-Schmidt | |
| 2011/0107052 A1 | 5/2011 | Narayanasamy | |
| 2011/0276744 A1 | 11/2011 | Sengupta et al. | |
| 2011/0276780 A1 | 11/2011 | Sengupta et al. | |
| 2011/0283082 A1 | 11/2011 | McKenney et al. | |
| 2011/0307659 A1* | 12/2011 | Hans | G06F 3/0613 711/114 |
| 2012/0011144 A1 | 1/2012 | Transier et al. | |
| 2012/0012248 A1 | 1/2012 | Brouckaert et al. | |
| 2012/0102248 A1 | 4/2012 | Tailliet | |
| 2012/0124046 A1 | 5/2012 | Provenzano | |
| 2012/0137059 A1 | 5/2012 | Yang et al. | |
| 2012/0323860 A1* | 12/2012 | Yasa | G06F 17/30156 707/692 |
| 2013/0036277 A1 | 2/2013 | Szczepkowski et al. | |
| 2013/0042083 A1 | 2/2013 | Mutalik et al. | |
| 2013/0073821 A1* | 3/2013 | Flynn | G06F 3/061 711/162 |
| 2013/0166820 A1* | 6/2013 | Batwara | G06F 12/0246 711/103 |
| 2013/0275656 A1 | 10/2013 | Talagala et al. | |
| 2013/0318051 A1* | 11/2013 | Kumar | G06F 17/30156 707/692 |
| 2013/0318288 A1 | 11/2013 | Khan et al. | |
| 2014/0101113 A1 | 4/2014 | Zhang et al. | |
| 2014/0133237 A1 | 5/2014 | Sprouse et al. | |
| 2014/0136759 A1 | 5/2014 | Sprouse et al. | |
| 2014/0136760 A1 | 5/2014 | Sprouse et al. | |
| 2014/0181041 A1 | 6/2014 | Whitehead et al. | |
| 2014/0195720 A1 | 7/2014 | Akella et al. | |
| 2014/0201385 A1 | 7/2014 | Rhea | |
| 2014/0229790 A1 | 8/2014 | Goss et al. | |
| 2014/0304524 A1 | 10/2014 | Gokhale et al. | |
| 2014/0304525 A1 | 10/2014 | Novak et al. | |
| 2014/0310476 A1 | 10/2014 | Kruus et al. | |
| 2014/0344234 A1 | 11/2014 | Amarendran et al. | |
| 2014/0358871 A1* | 12/2014 | Cideciyan | G06F 17/30156 707/692 |
| 2014/0365449 A1* | 12/2014 | Chambliss | G06F 17/30303 707/692 |
| 2014/0379985 A1 | 12/2014 | Barber | |
| 2015/0127621 A1 | 5/2015 | Kuo | |
| 2015/0277791 A1* | 10/2015 | Li | G06F 3/0619 711/114 |
| 2015/0379072 A1* | 12/2015 | Dirac | G06N 99/005 707/693 |
| 2016/0110120 A1* | 4/2016 | Pattabiraman | G06F 3/0613 711/156 |
| 2016/0357477 A1 | 12/2016 | Nakajima | |
| 2017/0091054 A1* | 3/2017 | Delaney | G06F 11/2015 |

OTHER PUBLICATIONS

Debnath, Biplob, et al., "'FlashStore: High Throughput Persistent Key-Value Store,'", *Proceeding of the VLDB Endowment* 3.1-2 (2010), (2010), 1414-1425.

Meister, Dirk, et al., "'dedupv1: Improving Deduplication Throughput using Solid State Drives (SSD),'", 2010 *IEEE 26th Symposium on Mass Storage Systems and Technologies (MSST)*, (2010), 1-6.

\* cited by examiner

| Block 0 B0–B49 | Block 1 B50–B99 | Block 2 B100–B149 | Block 3 B150–B199 | Block 4 B200–B249 | Block 5 B250–B299 | Block 6 B300–B349 | Block 7 | Block 8 |

Figure 12A

| Block 0 | Block 1 | Block 2 B100–B149 | Block 3 B150–B199 | Block 4 B200–B249 | Block 5 B250–B299 | Block 6 B300–B349 | Block 7 B0–B49 | Block 8 B50–B99 |

Figure 12B

| Block 0 | Block 1 | Block 2 B140–B209 | Block 3 | Block 4 B210–B279 | Block 5 B280–B249 | Block 6 | Block 7 B0–B69 | Block 8 B70–B139 |

Figure 12C

METHOD FOR HANDLING BLOCK ERRORS ON A DEDUPLICATED STORAGE SYSTEM

CROSS REFERENCE TO RELATED APPLICATIONS

This application claims priority and is a continuation in part of U.S. patent application Ser. No. 14/586,184, filed Dec. 30, 2014, which is incorporated herein by reference for all purposes.

This application is related to U.S. patent application Ser. No. 15/080,495, filed Mar. 24, 2016 for A METHOD FOR RECOVERING AN INDEX ON A DEDUPLCATED STORAGE SYSTEM, U.S. patent application Ser. No. 15/080,483, filed Mar. 24, 2016 for A METHOD FOR POPULATING A CACHE INDEX ON A DEDUPLCATED STORAGE SYSTEM, and U.S. patent application Ser. No. 15/080,490, filed Mar. 24, 2016 for A METHOD FOR MAINTAINING A CACHE INDEX ON A DEDUPL-CATED STORAGE SYSTEM, filed concurrently herewith, and to U.S. patent application Ser. No. 14/586,165, filed Dec. 30, 2014 for SOLID STATE CACHE INDEX FOR A DEDUPLICATE STORAGE SYSTEM, and U.S. patent application Ser. No. 14/586,128, filed Dec. 30, 2014 for SCALING AN SSD INDEX ON A DEDUPLCATED STORAGE, which are incorporated herein by reference for all purposes.

FIELD OF THE INVENTION

This invention relates generally to deduplicated storage systems, and more particularly to systems and methods for handling block errors on a SSD inside a deduplicated storage system.

BACKGROUND OF THE INVENTION

Deduplicated storage systems may contain data used during backup and recovery operations. For example, a client may backup its data to the deduplicated storage system. Similarly, the same client may attempt to recover its data from the deduplicated storage system. Recovery times may be at least partially based on how quickly the deduplicated storage system can locate the requested data.

There is a need, therefore, for an improved method, process, and system for quickly locating data on a deduplicated storage device.

BRIEF DESCRIPTION OF THE DRAWINGS

The present invention will be readily understood by the following detailed description in conjunction with the accompanying drawings, wherein like reference numerals designate like structural elements, and in which:

FIG. 12A depicts failed data blocks consistent with an embodiment of the present disclosure.

FIG. 12B depicts an updated index cache consistent with an embodiment of the present disclosure.

FIG. 12C depicts an updated index cache written to available blocks consistent with an embodiment of the present disclosure.

DETAILED DESCRIPTION

Figure 1:
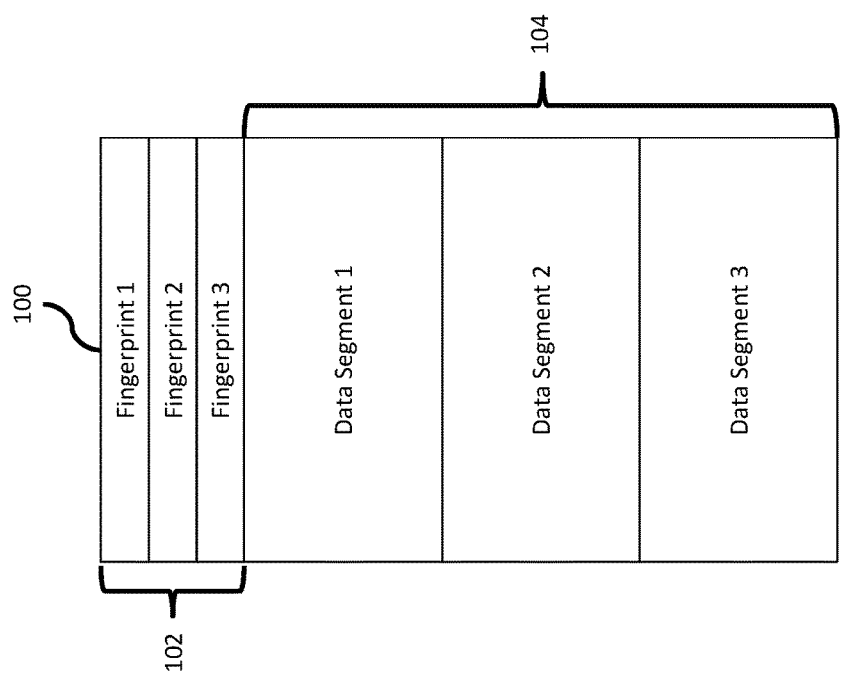
FIG. 1 depicts a logical container consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure discusses systems, methods, and processes for building and maintaining an index for a deduplicated storage system on a solid-state drive ("SSD"). Data may be stored on the deduplicated storage system as segments packaged together into logical containers. These containers may be written to disk or other storage media in the deduplicated storage system. Occasionally, the segment may need to be read from the storage system. The index discussed herein allows the deduplicated storage system to quickly determine whether a segment already exists on the storage system, identify its logical container, and rapidly locate and read the segment from the storage media.

FIG. 1 depicts a logical container consistent with an embodiment of the present disclosure. Containers may be a logical entity or package containing one or more data segments and associated metadata. These containers may be passed around by different components of the deduplicated storage system for processing and may be written to a storage media. Container 100, for example, contains metadata section 102 and data section 104. Data section 104 contains three data segments comprising data to be stored on a deduplicated storage system. This data may have been received from an external system, for example as part of a backup process. Metadata section 102 includes three fingerprints associated with the data segments in data section 104. Processing each data segment using a hashing process may generate these fingerprints. As a result, each fingerprint may substantially uniquely identify each data segment. For example, processing Data Segment 1 using a hashing process may generate Fingerprint 1. In an embodiment, these containers are created by a software component residing in the deduplicated storage system as data is received from the external system.

As containers are processed by the deduplicated storage system they may be written to a storage media, such as a hard driver ("HDD"). To conserver resources, however, it may be desirable to ensure each data segment is only written to the storage media one time. Storing the segment more than once may waste storage resources and increase system cost. This may be particularly problematic in a backup system where received data only comprises minor changes. Determining whether a segment already exists on disk for every write, however, may be an inefficient use of processing resources. Scanning an entire volume for every received segment may drastically reduce system performance. Similarly, a data segment may occasionally need to be read from the storage medium, for example as part of a restore operation. Again, scanning the entire system to locate the segment may be an inefficient use of resources. The index discussed herein helps alleviate these concerns.

The index discussed herein comprises a data structure storing fingerprint/container associations. This allows the index to identify a container housing a data segment given that data segment's fingerprint. In an embodiment, the index is a hash table comprising one or more hash buckets. As containers are received, the metadata section is removed and each individual fingerprint is hashed to identify a hash bucket. A value comprising the fingerprint and a container identifier is then stored in the hash bucket, where the container identifier is a unique value identifying the container containing the fingerprint and it's associated data segment. Additionally, each bucket may contain multiple fingerprint/container identifier values.

For example, FIG. 1 depicts container 100 comprising metadata section 102. Container 100 may also have a unique container identifier. Metadata section 102 may be read, and Fingerprint 1, Fingerprint 2, and Fingerprint 3 may each be processed by the hashing process to identify one or more buckets. Once a bucket is identified for a given fingerprint, both the fingerprint and the container identifier may be stored in that bucket. For example, a value of {fpl, cid}, where fpl is Fingerprint 1 and cid is container 100's container identifier, may be stored in the bucket identified by the hash of Fingerprint 1. If the hash of Fingerprint 2 and/or Fingerprint 3 identifies the same bucket as Fingerprint 1, their fingerprint/container identifier mappings may also be stored in the bucket. Alternatively, Fingerprint 2 and/or Fingerprint 3 hash to different buckets.

Given the above data structure, a container housing a given fingerprint and its associated data segment may be quickly identified using the index. A fingerprint may be received and hashed to identify the bucket that may contain the fingerprint/container identifier association. All the associations in the bucket may be iterated over, and the fingerprint values may be compared. If there is a match, the associated container identifier may be returned. If there is not a match, the fingerprint and its associated data segment may not exist on the deduplicated storage system. This process is discussed in detail below with reference for FIG. 8.

Figure 2:
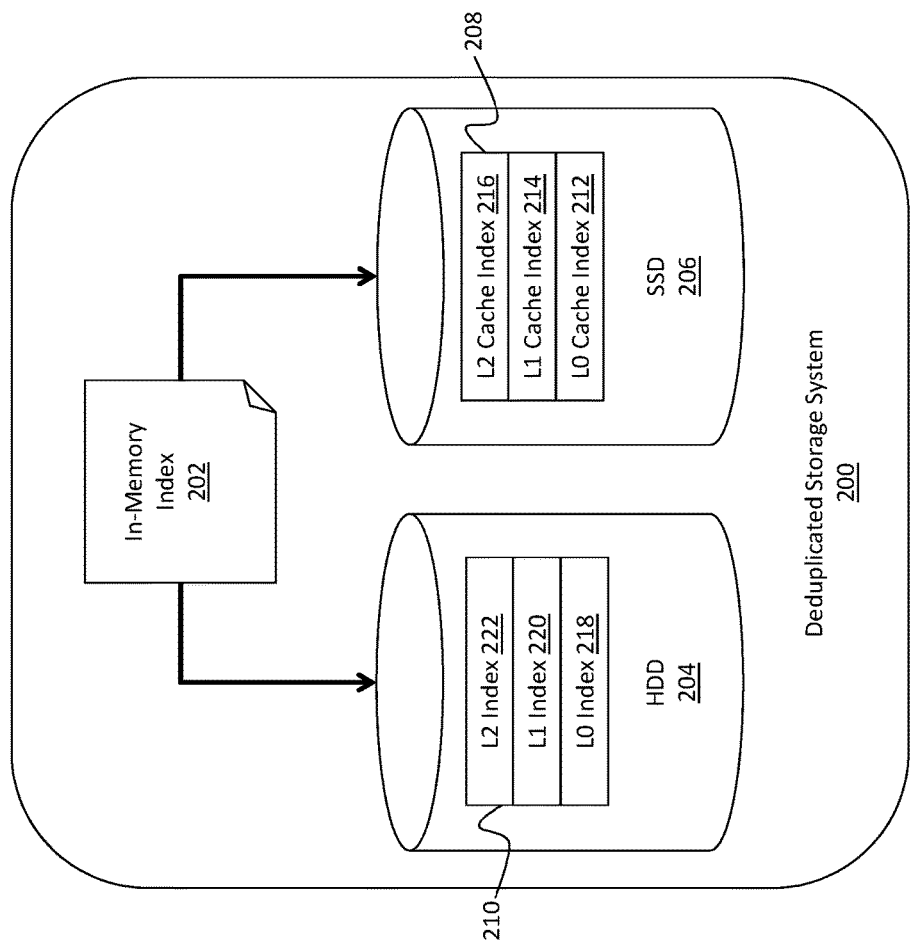
FIG. 2 depicts a deduplicated storage system including an index consistent with an embodiment of the present disclosure.

FIG. 2 depicts a deduplicated storage system comprising an index consistent with an embodiment of the present disclosure. While FIG. 2 depicts components of the system relevant to the index, the deduplicated storage system may include numerous additional components and modules. For example, the deduplicated storage system may include a component for creating and packaging the containers discussed in reference to FIG. 1, and may also include storage media for storing these containers. The following discussion addresses modules used to create and maintain the index.

Deduplicated storage system 200 may include in-memory index 202, hard drive 204, and solid-state drive 206. In some embodiments, in-memory index 202 may also be referred to as an in-memory hash table or a merge buffer. HDD 204 may comprise one or more disk drives. SSD 206 may comprise one or more solid-state storage devices.

As containers are received and/or processed by deduplicated storage system 200, their identifiers may be placed in in-memory index 202. In-memory index 202 may comprise an index substantially similar to that described above, and in an embodiment resides in the memory of the deduplicated storage system. Processing the containers and storing them initially in in-memory index 202 may allow the fingerprint/container identifier values to be quickly inserted into the appropriate hash bucket. Given memory capacity and persistence limitations, however, in-memory index 202 may need to be merged into persistent indexes at given time intervals or when a size threshold is reached. For example, in-memory index may be merged into HDD index 210 and/or cache index 206 for persistent storage.

Turning first HDD index 210, in-memory index 202 may be merged into an existing index residing on HDD 204. In an embodiment, the hash buckets of in-memory index 202 may map 1:1 to hash buckets on HDD index 210. For example, both in-memory index 202 and HDD index 210 may accommodate the same number of buckets. Merging the two indexes may comprise inserting the fingerprint/container identifier values into their corresponding hash buckets in HDD index 210.

In some embodiments, HDD index 210 may comprise different index levels, which in some embodiments are different index files stored on disk. These index levels could be, for example, L0 index 218, L1 index 220, and L2 index 222. In an embodiment, each index level may contain a portion of HDD index 210. For example, L0 index 218 may comprise the primary index file while L1 index 220 and L2 index 222 serve as buffers between in-memory index 202 and L0 index 218.

In an embodiment, when in-memory index 202 is merged into HDD index 204, it may first be merged into a higher-level index file. For example, the merge processes may read L1 index 220 from disk, and insert the fingerprint/container identifier values into the corresponding hash buckets in L1 index 220. Once the values are inserted, L1 index 220 may be written back to disk.

L1 index 220 may include a size threshold used to determine when to merge L1 index 220 with L0 index 218. For example, L1 index 220 may be limited to a certain size. Once that size is reached and/or exceeded, the fingerprint/container identifiers may be read from L1 index 220 and inserted into L0 index 218. After L1 index 220 is merged into L0 index 218, the entries may be removed from L1 index 220 and/or the file may be deleted.

In some embodiments, in-memory index 202 may need to be written to HDD index 210 while L1 index 220 is being merged with L0 index 218. In such an embodiment, in-memory index 202 may be written to L2 index 222. After the L1 index 220 is finished merging with L0 index 218, L2 index 222 may be designated the new L1 index 220. In some embodiments, designating the L2 index 222 as the L1 index 220 may comprise changing the file name of the index.

With reference now to SSD index 208, a similar merge process is discussed. In-memory index 202 may be merged into SSD cache index 208 before, during, or after merging into HDD index 210. In some embodiments, SSD cache index 208 may be similar to HDD 210. SSD cache index may include L0 cache index 212, L1 cache index 214, and L2 cache index 216 which may perform substantially similar to L0 index 218, L1 index 220, and L2 index 222, respectively. Storing the index on SSD 206 in addition to HDD 204 may significantly increase lookup times, as discussed in detail below.

In some embodiments, in-memory/HDD hash buckets and SSD hash buckets may not comprise a 1:1 mapping. Rather, the in-memory/HDD hash bucket to SSD hash bucket mapping may be 1:N. In other words, one HDD hash bucket may map to many SSD hash buckets. This difference could be due to resource or other constraints on the SSD. As a result, the HDD hash buckets and/or in-memory hash buckets may need to be mapped to specific SSD hash buckets during the merge process. This mapping is discussed in reference to FIG. 3.

Figure 3:
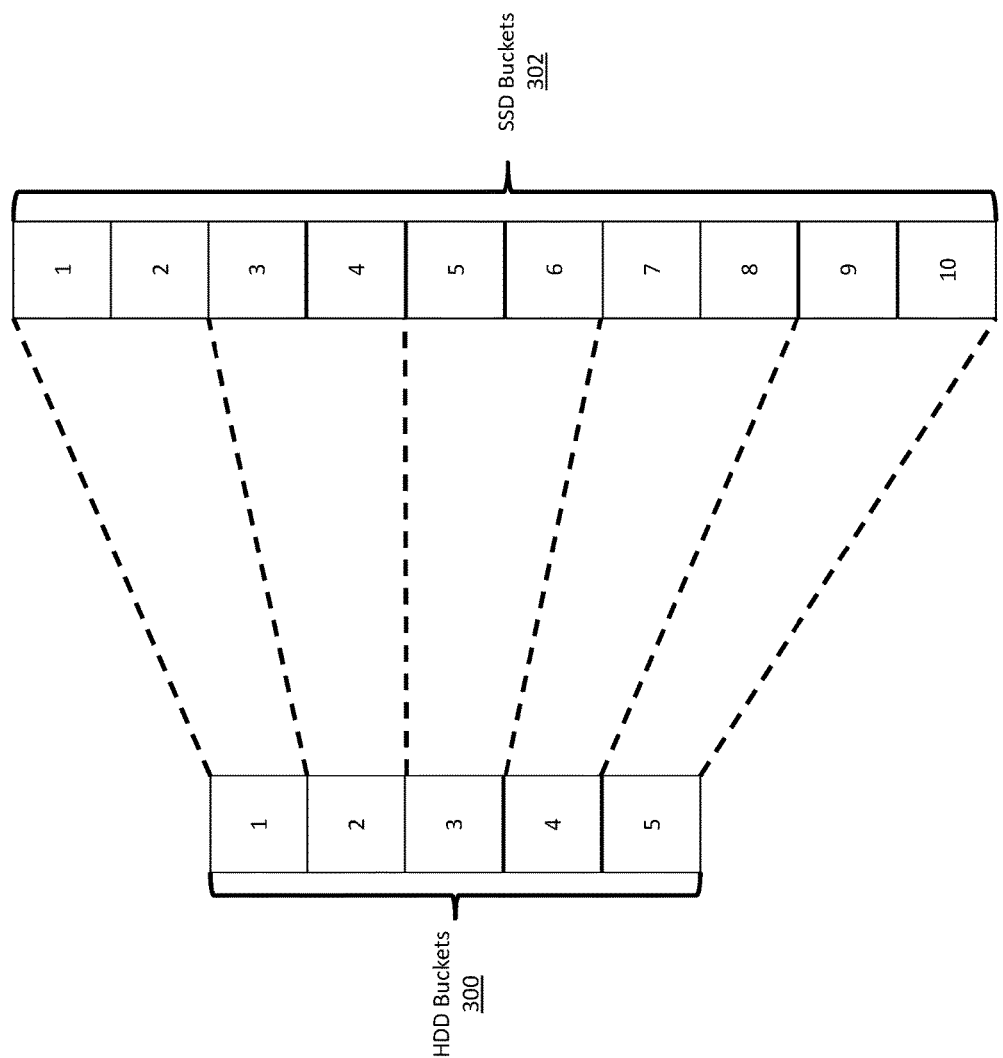
FIG. 3 depicts a HDD bucket to SSD bucket mapping consistent with an embodiment of the present disclosure.

FIG. 3 depicts a one-to-many HDD bucket to SSD bucket mapping. In some embodiments, an individual SSD bucket size may be limited to its page size. This could be, for example, 4K or 8 sectors. HDD buckets, however, may not have a similar size limitation. As individual SSD buckets approach capacity, the system may need to increase the number of buckets available to maintain the index. As a result, one HDD bucket may need to be mapped to multiple SSD buckets. For example, FIG. 3 depicts a system with five HDD buckets 300 mapped to ten SSD bucket 302. In an embodiment, increasing the number of SSD buckets may occur at the start of a merge process.

In an embodiment, the first time the index is created on an SSD the HDD bucket to SSD bucket mapping may be 1:1. The first time the index is created there may be a limited number of fingerprint/container identifiers entries, and therefore the SSD buckets may not initially be at capacity. At the start each subsequent merge, however, a check may be made to determine whether the SSD buckets will reach capacity as a result of the merge process. The check may occur when the in-memory index is merged with the SSD index, or when one of the constitute levels of the SSD index are merged with each other. For example, the check may occur when the L1 index is merged with the L0 index. If the SSD buckets are not at capacity, the entries may be merged into the existing buckets. If the SSD buckets are at capacity or some predetermined threshold (e.g. 90% capacity), the number of buckets may be increased and the entries may be inserted into the new buckets.

Scaling the number of available SSD buckets may comprise doubling the number of buckets on the SSD. For example, FIG. 3 depicts a 1:2 HDD to SSD bucket mapping. The next time the SSD buckets are scaled they may comprise a 1:4 mapping. This scaling process may continue until there is no available SSD space.

The number of buckets may be scaled until the SSD reaches capacity, at which point a new SSD device may need to be added to the system. For example, in the initial 1:1 mapping both the SSD and HDD indexes may comprise 64 million buckets. If each SSD bucket it 4K, than the initial SSD index size is 512 GB. If the deduplicated system has 2 TB of available SSD capacity, the index may be scaled twice, once to 1 TB and again to 2 TB, before more SSD capacity is needed to maintain the index.

In some embodiments the SSD index may not initially comprise a 1:1 mapping to HDD buckets. In the above example, the index may initially be scaled to 2 TB, or 256 million buckets. This may, however, result in a large number of empty buckets on the SSD. Writing these empty buckets to the SSD may cause unnecessary wear to the drive, which may be avoided by scaling the index only when the available buckets are approaching capacity.

Once the SSD index is appropriately scaled, the HDD buckets may be mapped to the SSD buckets for inserting fingerprint/container identifier values and/or locating fingerprint/container identifier values. In some embodiments, the buckets may be stored contiguously on the HDD and the SSD. As a result, a scaling factor and second hashing process may be used to identify the SSD buckets mapped to a given HDD bucket.

The formula for identifying the SSD bucket may be the following:

ssd_bucket_id=hdd_bucket_id*scale_factor+hash (fingerprint) % scale_factor.  Formula 1:

In an embodiment, hdd_bucket_id may be the HDD bucket. The scale_factor may be a numerical value identifying the number of SSD buckets for every HDD bucket. For example, if the SSD index is always doubled, the scaling factor will always be a power of two (2, 4, 8, 16, etc). Finally, hash (fingerprint) may comprise a second hash of the fingerprint. This second hash may be different from the first hash mapping the fingerprint to an HDD bucket. Once the appropriate SSD bucket is identified, it may be retrieved and processed appropriately.

After the HDD buckets are mapped to the SSD buckets, fingerprint/container identifier values may be entered into and/or read from the SSD buckets. For example, if the SSD index was scaled as part of a merge process the new entries may be inserted into the SSD buckets. In some embodiments, the SSD buckets contain a single word from the fingerprint rather than the entire fingerprint. For example, if the fingerprint is five bytes long the SSD bucket may only store one of the bytes (i.e. the byte is the word). Storing a single word from the fingerprint may reduce capacity requirements, thereby lowering the cost of the SSD index.

Figure 4:
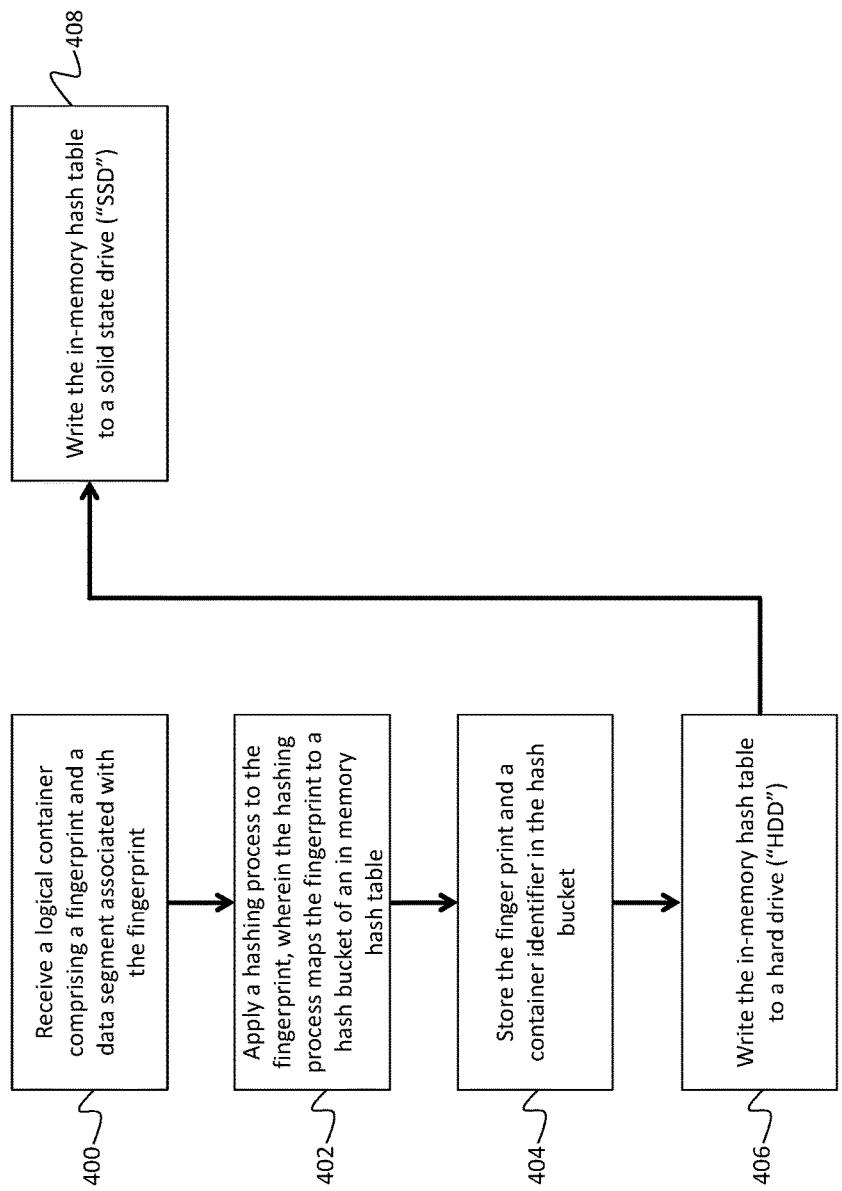
FIG. 4 depicts a process for building an index consistent with an embodiment of the present disclosure.

Turning now to FIG. 4, a process for building and maintaining an index on a SSD is discussed. At block 400, a logical container comprising a fingerprint and an associated data segment may be received. This logical container may be received from an external system, or it may be received from a separate software and/or hardware module operating in the deduplicated storage system. In some embodiments, the logical container may be substantially similar to container 100 depicted in reference to FIG. 1.

At 402, a hashing process may be applied to the fingerprint. This hashing process may map the fingerprint to a hash bucket in an in-memory hash table, such as in-memory index 202. In some embodiments the logical container may include multiple fingerprints and data segments and each of the fingerprints may be mapped to a hash bucket, which in some instances may be the same hash bucket.

At 404, the fingerprint and a container identifier may be stored in the hash bucket. For example, a fingerprint/container identifier association may be stored as a value in the hash bucket. In some embodiments the container identifier is a value uniquely identifying a logical container.

At block 406, the in-memory hash table may be written to a HDD. This HDD could be, for example, HDD 204. The in-memory hash table may be merged with an index already existing on the HDD, such as HDD index 210.

Finally, at block 408, the in-memory hash table may be written to a SSD. In some embodiments, writing the in-memory hash table to the SSD may comprise merging the in-memory hash table with an index that already exists on the SSD. This merge process may be substantially similar to that discussed above in reference to FIG. 2.

Figure 5:
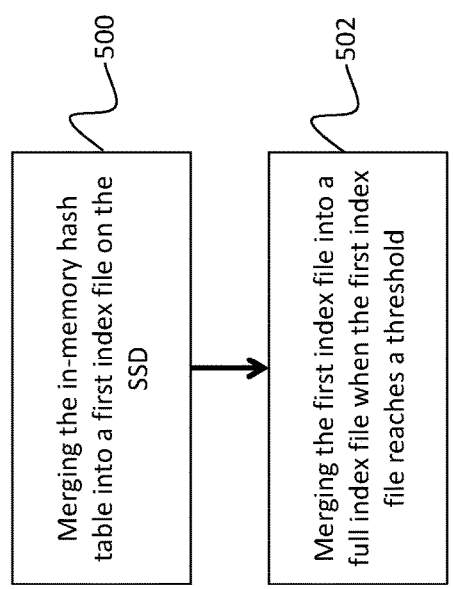
FIG. 5 depicts a process for merging hash files consistent with an embodiment of the present disclosure.

FIG. 5 depicts a process for merging the in-memory hash table with an SSD index consistent with an embodiment of this disclosure. In an embodiment, the SSD index may divided into multiple levels. For example, the SSD index may comprise an L0 cache index, L1 cache index, and L2 cache index as depicted in FIG. 2. These index levels may in the aggregate create the SSD index.

At block 500, for example, the in-memory hash table may be merged into a first index file on the SSD. This may be substantially similar to the merging process discussed in reference to FIG. 2 with respect to the HDD and the SSD. For example, in-memory hash table may be similar to in-memory index 202 and the first index file may be similar to L1 cache index 214. During the write process, L1 cache index may be read from the SSD and the fingerprint/container identifier values may be inserted into the cache index. The L1 cache index may then be written back to the SSD for persistent storage.

At block 502, the first index file may be merged into a full index file when the first index file reaches a threshold. For example, the full index file may be the L0 cache index depicted in FIG. 2. When the L1 cache index reaches a threshold, such as a file size or entry limit, the L1 cache index may be written into the L0 cache index file. If the in-memory hash table reaches capacity and needs to be flushed to persistent storage during the L1 or L0 merge, it may be written to L2 cache index until the merge is complete. The L2 cache index file may then be designated as the L1 cache index for future merges.

Figure 6:
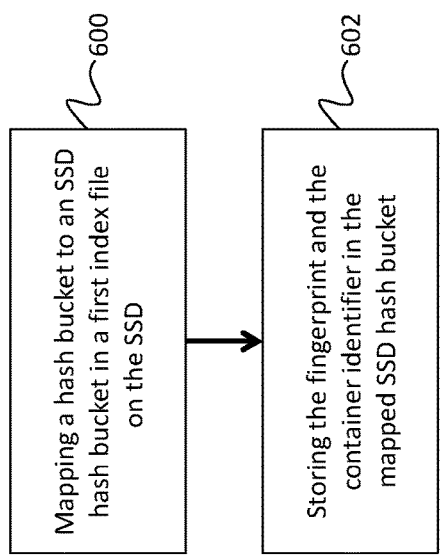
FIG. 6 depicts a HDD to SSD bucket mapping consistent with an embodiment of the present disclosure.

FIG. 6 depicts a process for mapping a hash bucket to a SSD hash bucket. This could be, for example, a result of scaling the index as discussed in reference to FIG. 3. In some embodiments, the hash bucket may be a HDD hash bucket. Additionally or alternatively, it may be a hash bucket from the in-memory index.

At block 600, the hash bucket may be mapped to the SSD hash bucket. Applying Formula 1 discussed above may provide this mapping. Once the SSD hash bucket is identified, the fingerprint and container identifier may be stored in the SSD hash bucket at 602.

Figure 7:
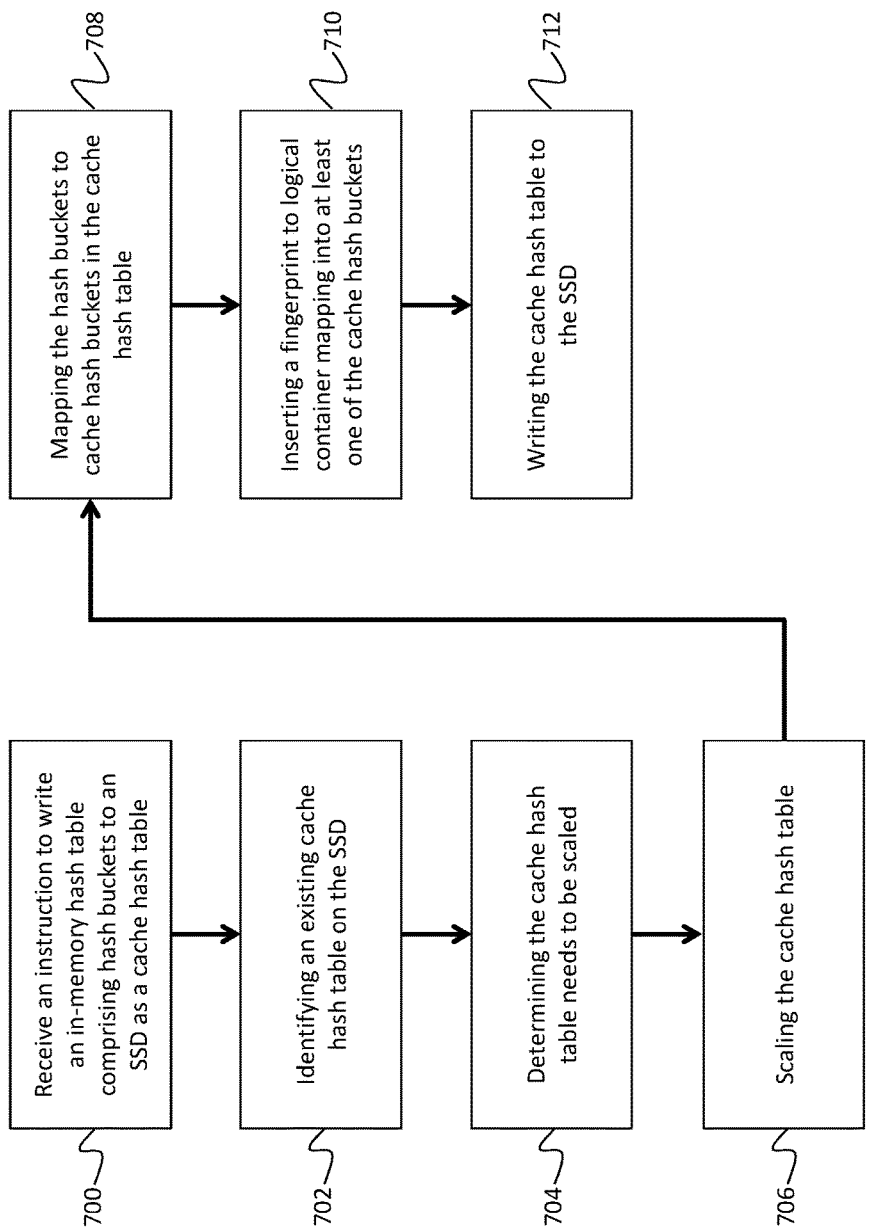
FIG. 7 depicts a process for scaling a hash cache consistent with an embodiment of the present disclosure.

FIG. 7 depicts a process for scaling the SSD index consistent with an embodiment of the present disclosure. This scaling process could be, for example, substantially similar to that discussed in reference to FIG. 3. At block 700, an instruction may be received to write an in-memory hash table to a SSD as a cache hash table. The in-memory hash table could be, for example, similar to in-memory index 202. The cache hash table may be similar to SSD cache index 208.

At 702, an existing cache hash table, such as cache hash index 208, may be identified on the SSD. This existing table could be the result of an earlier write, and may comprise a plurality of cache hash buckets.

At 704, the process may determine that the cache hash table needs to be scaled. For example, the buckets in the cache hash table may be reaching capacity. Additionally or alternatively, a new SSD device may have recently been added to the system and the cache hash may be scaled to accommodate the newly available space.

At 706, the cache hash table may be scaled. As discussed above, this scaling process may comprise doubling the number of buckets in the index. The scaling may be in response to the determination at 704 that the index needs to be scaled.

At 708, hash buckets from the in-memory hash table may be mapped to the cache hash buckets in the cache hash table. This mapping process may be substantially similar to the HDD to SSD bucket mapping discussed above. In some embodiments, the mapping may apply Formula 1 to determine the identity of the cache hash buckets corresponding to the hash buckets.

At 710, the fingerprint/container identifier mapping may be inserted into at least one of the cache hash buckets. For example, the fingerprint/container identifier mapping may be inserted into the cache hash bucket identified at block 708. In some embodiments, only one word from the fingerprint may be inserted into the cache hash bucket Finally, at 712, the cache hash table may be written to the SSD. This cache hash table and its corresponding entries may then be used to quickly identify container identifiers given a particular fingerprint, as discussed in reference to FIG. 8.

Figure 7A:
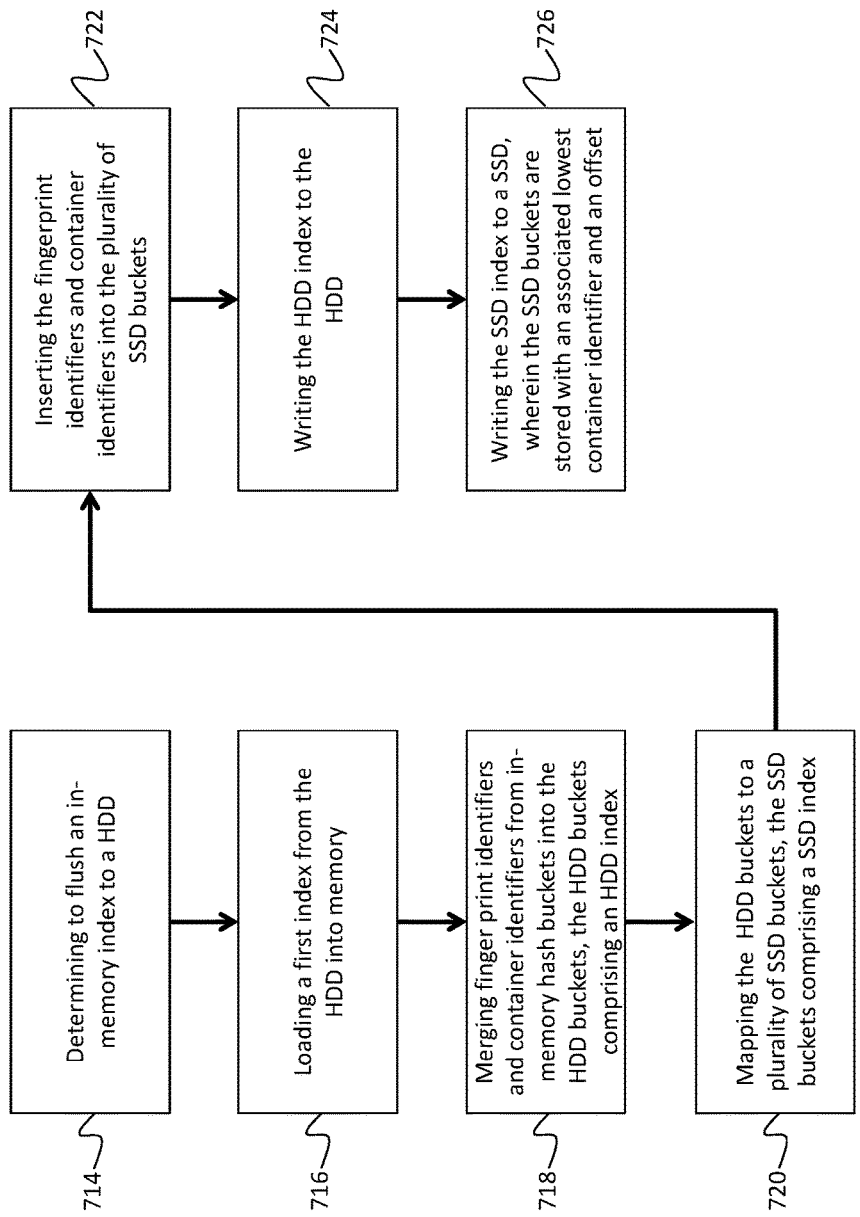
FIG. 7A depicts a process for maintaining a cache index consistent with an embodiment of the present disclosure.

FIG. 7A depicts an additional or alternative mechanism for populating an index cache on a deduplicated storage system. In some embodiments, the process may tap into a write path to a HDD containing an authoritative copy of the index, such as HDD index 210. Tapping into the HDD write path may be beneficial as it may allow the index cache to be populated on a higher performance media, such as an SSD, with minimal additional processing since the writes have already been created for the HDD.

At block 714, a determination may be made to flush an in-memory index to an HDD. This determination may occur, for example, when the in-memory index approaches, meets, or crosses a threshold, such as 95% capacity, or when the in-memory index reaches its capacity. The determination may further comprise identifying a destination index, such as a cache index. For example, the determination may decide to merge the in-memory index into cache file L1, as discussed above. Additionally or alternatively, the determination may be to merge two cache files, such as the L1 and L0 cache files. In such an embodiment, the cache files may be loaded into memory prior to the merging process.

At block 716, the destination index, also called the first index, may be loaded into memory. For example, the in-memory index identified at block 714 may comprise in-memory index 202, and the destination index may comprise L1 index 220. Similarly, the destination index may include L2 index 222 and/or L0 index 218, as discussed above.

In some embodiments, the process may merge two index files already stored to persistent storage, such as L1 index and L0 index on HDD 204. In such an embodiment, the in-memory index may comprise the source index, such as L1 index 220 or L2 index 222, and the first index may comprise the destination index, such as L0 index 218 or L1 index 220.

At 718, fingerprint identifiers and container identifiers may be merged from the in-memory hash buckets into the hash buckets comprising the destination index. In an embodiment, merging the fingerprint/container identifiers may comprise merging an in-memory hash bucket with its corresponding HDD hash bucket. Additionally or alternatively, the HDD hash buckets may comprise an authoritative index, such as L0 index 218, L1 index 220, and/or L2 index 222.

At block 720, the HDD buckets may be mapped to a plurality of SSD buckets. This mapping may be similar to that discussed at least in reference to FIG. 3, and may occur before, after, or during the in-memory bucket to destination index merge. In some embodiments, the SSD buckets may comprise a cache index stored and/or destined for an SSD, such as SSD index 208. For example, the SSD buckets may comprise L0 cache index 212, L1 cache index 214, and/or L2 cache index 216. Additionally or alternatively, the SSD index may correspond with the first index identified in block 716. For example, if the first index is L1 index 220, the SSD index may comprise L1 cache index 214. This may enable the cache index to serve as a cache for the associated authoritative index.

At 722, the fingerprint and container identifiers may be inserted into the identified SSD buckets. For example, Formula 1 may be used to map a HDD bucket to two or more SSD buckets, and the fingerprint/container identifiers in the HDD bucket may be inserted into the SSD bucket.

In some embodiments, writing the fingerprint identifiers and the container identifiers may comprise compressing the identifiers. For example, only one word from the fingerprint may be stored in the SSD buckets. If the fingerprint is five bytes long, only one of those bytes may be stored in the bucket.

Additionally or alternatively, storing a lowest and/or highest container identifier and an offset may compress container identifiers. Container identifiers may be numeric values, such as hexadecimal values. Each bucket may container the lowest and/or highest container identifier stored in that bucket. The bucket may then contain an offset of each stored container identifier, rather than the entire container identifier, from the lowest or highest container value. For example, if the lowest container value is 1000, and container identifier 1005 is merged into the bucket, the bucket may store only the value 5 rather than the entire container identifier.

At block 724 the HDD index may be written back to the HDD. The HDD index may include all the fingerprint/container identifiers from the merge. In other words, the HDD buckets written back to the HDD may now include the fingerprint/container identifiers from the in-memory index, as well as those that were loaded from the HDD.

Finally, at 726, the SSD cache index may be written to a SSD. In some embodiments writing the SSD index may comprise storing the index persistently on the SSD for future lookups.

Figure 8:
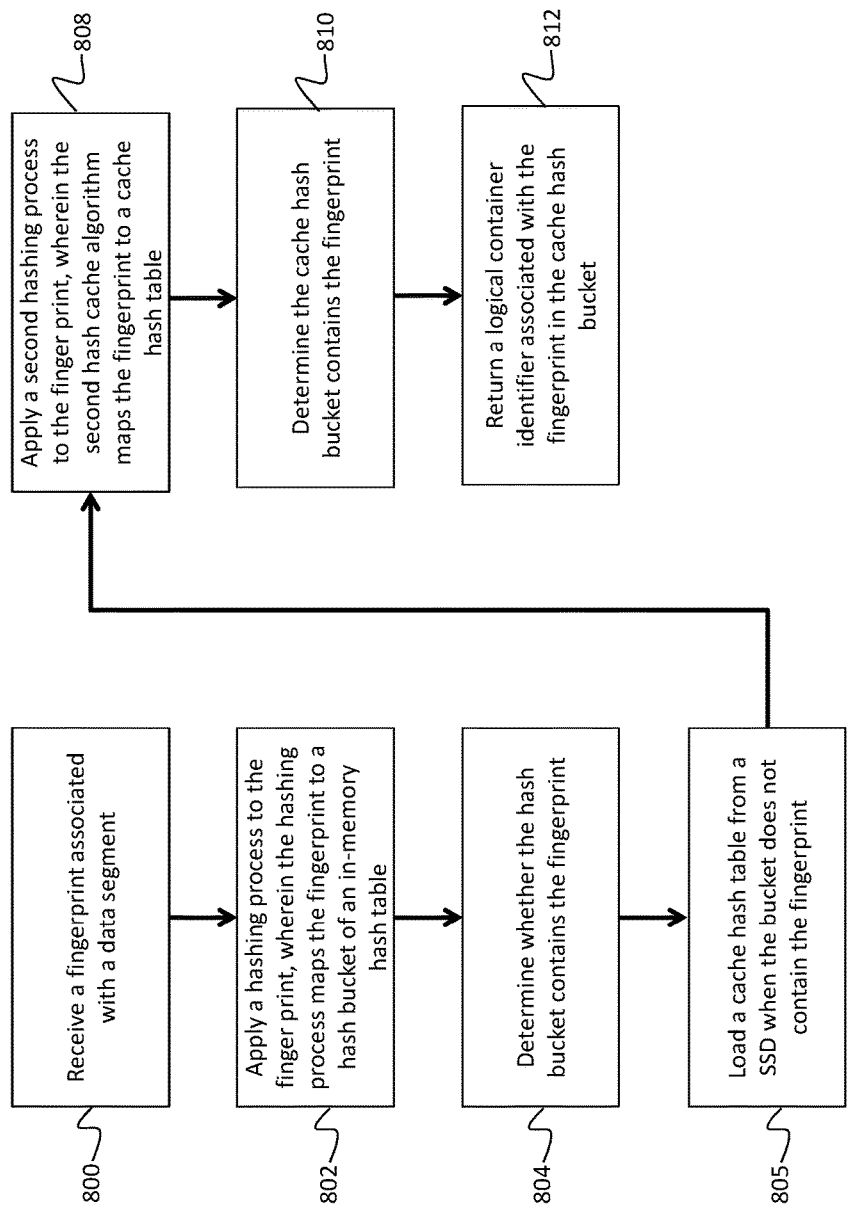
FIG. 8 depicts a process for performing a cache lookup consistent with an embodiment of the present disclosure.

Turning now to FIG. 8, a process for locating containers, container identifiers, and/or data segments using the SSD cache index is discussed. Locating container identifiers using the SSD cache index may be preferable to using the HDD cache index because SSD media may provide faster lookup times. Maintaining the index on the HDD in addition to the SSD may provide redundancy in case the SSD fails, becomes corrupt, or the lookup misses. FIG. 8 provides an example of this lookup process.

At block 800, a fingerprint associated with a data segment may be received. This fingerprint may be received from an external system, or from a separate software module within the deduplicated storage system. In some embodiments the fingerprint may be received as part of a restore process. A remote system may have a data backup residing on the deduplicated storage system, and the segment associated with the fingerprint may be part of that backup. The fingerprint may be provided to the index to locate the logical container containing that segment so it may be read to restore the remote system.

At block 802, a hashing process may be applied to the fingerprint. In an embodiment, this hashing process maps the fingerprint to a hash bucket in an in-memory hash table. This hash table could be, for example, substantially similar to in-memory index 202. It may be preferable to check the in-memory index for the a fingerprint match prior to checking the SSD cache index or the HDD index because the in-memory index may contain the fingerprint that has not yet been written to persistent storage. For example, the fingerprint/container identifier association may have recently been inserted into the in-memory index, and that index may not yet have been merged to the HDD or SSD.

At 804, the process determines whether the identified hash bucket contains the fingerprint. If the bucket contains multiple fingerprint/container identifier values, the process may iterate over all of the values and compare the fingerprints. If a match is found, the container identifier may be returned and the index lookup process may terminate. If no match is found, the process may continue to block 806.

At block 806 a cache hash table may be loaded from the SSD when the in-memory hash bucket does not contain the fingerprint. This cache hash table may be substantially similar to cache hash index 208. In some embodiments, loading the cache hash table comprises reading the cache hash table from the SSD. If the cache hash table comprises different files, such as L0 cache index and L1 cache index, each file may be loaded and processed individually. Additionally or alternatively, the index files may all be merged into one file, such as L0 cache index, and then the one file may be loaded for processing.

At block 808, a second hashing process may be applied to the fingerprint to identify a bucket in the cache hash table. For example, the second hashing process may be applied to the fingerprint as part of Formula 1. Additionally or alternatively, a scaling factor and/or the first hashing process may be used to identify the cache hash bucket. This process may be substantially similar for inserting the fingerprint/container identifier into the cache hash as discussed above.

At 810, a check may determine whether the cache hash bucket contains the fingerprint. For example, the process may iterate through all the entries in the cache hash bucket and compare the stored fingerprint with the received fingerprint. In some embodiments, the cache hash bucket may only contain one word of each fingerprint. If the fingerprint is five bytes long, for example, the bucket may only contain one of the bytes. The corresponding word from the received fingerprint may be compared to the stored word in the cache hash bucket. For example, if the system stores the second word from the fingerprint, the second word from the received fingerprint may be compared to the entries in the cache hash bucket.

If the determination at block 810 identifies a match, the associated container identifier may be returned at 812. Once the container identifier is returned the index lookup process may terminate.

If block 810 does not identify a fingerprint match, the SSD cache has experienced a miss. The process may continue to load the HDD index off a HDD and attempt to locate the fingerprint in that index. Keeping a full copy of the index on the HDD is therefore beneficial because it provides redundancy and allows the system to operate in the event of an error with the SSD cache index.

Figure 9:
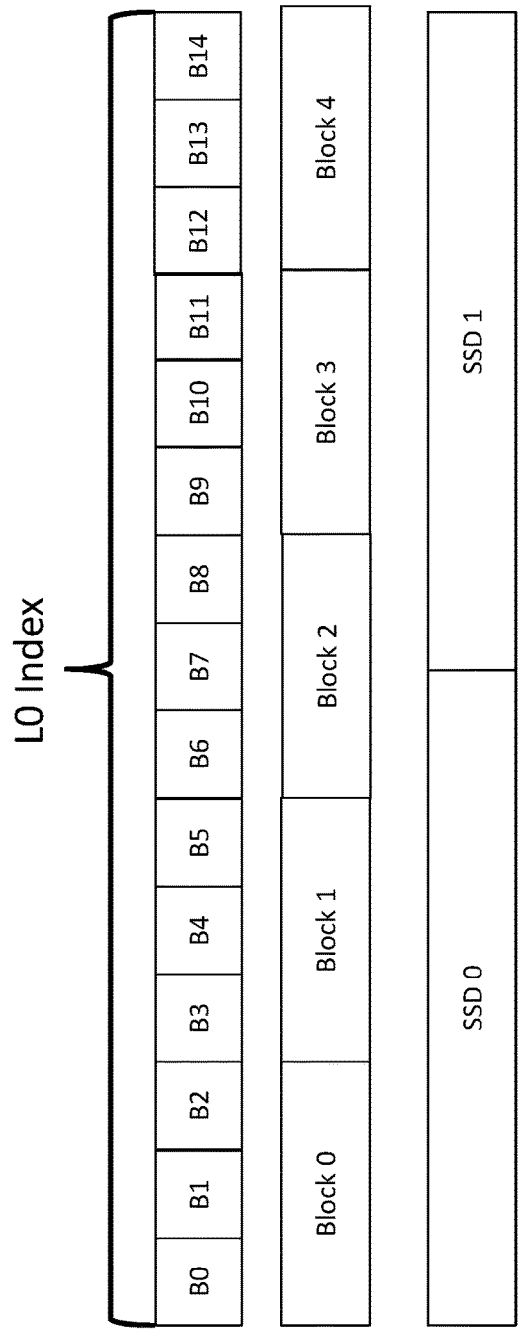
FIG. 9 depicts an index layout consistent with an embodiment of the present disclosure.
Figure 10:
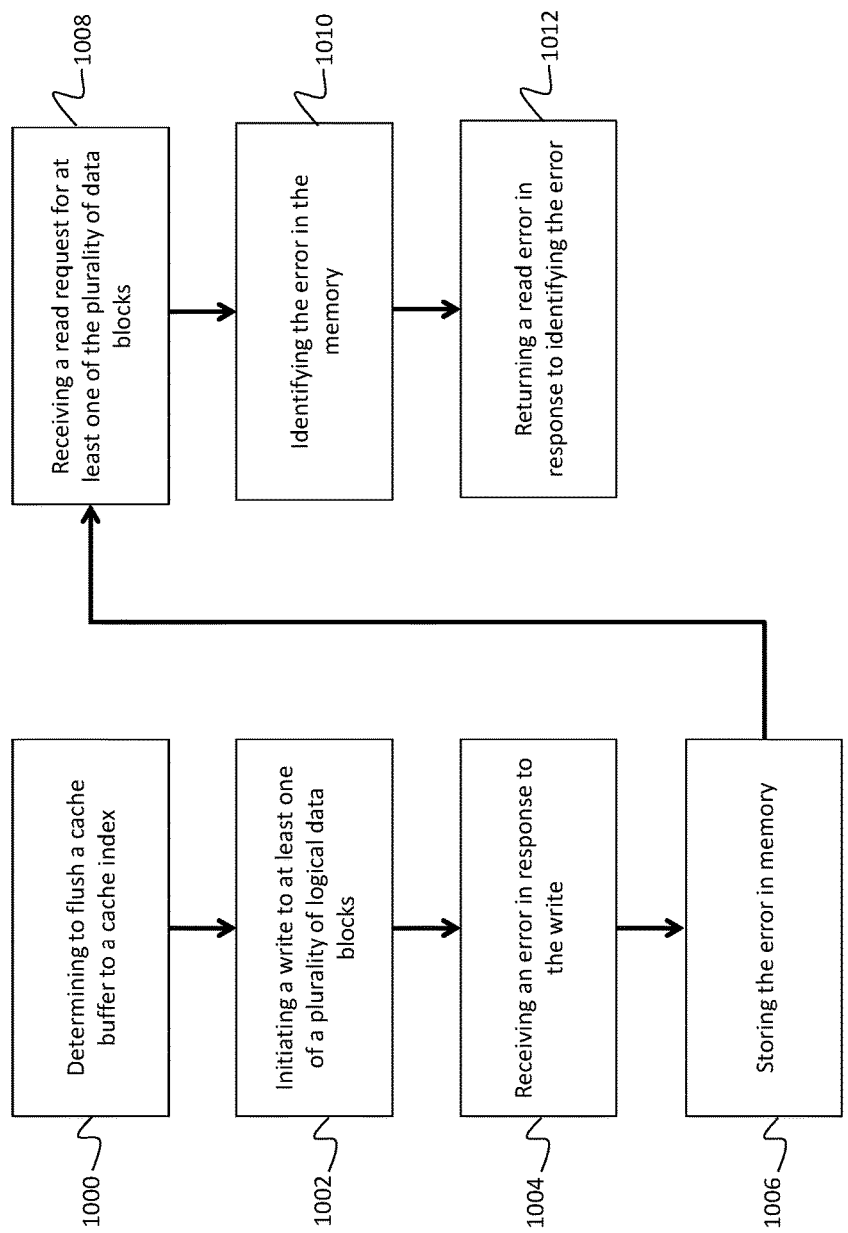
FIG. 10 depicts a process for error handling consistent with an embodiment of the present disclosure.

Turning now to FIG. 9 and FIG. 10, a process for handling errors in a cache index is discussed. FIG. 9 discuses how a cache index may be stored to an SSD and/or an HDD, while FIG. 10 addresses how to handle errors arising during that storage process.

FIG. 9 depicts a plurality of hash buckets comprising an index cache, such as L0 cache index 212. In some embodiments, the L0 index may comprise a file containing hash buckets B0-B14. Hash buckets B0-14 may be substantially similar to SSD buckets 302. Hash buckets may be grouped in logical blocks, such as Block 0 through Block 4, which may then be stored to one or more SSD's, such as SSD 0 and SSD 1. Similarly, the buckets and/or blocks may be stored on an HDD.

While FIG. 9 shows fifteen buckets, five blocks, and two SSD's, the system may contain any number of these components. For example, a system may contain millions of hash buckets. FIG. 9 depicts smaller numbers for ease of illustration.

In an embodiment, logical Block 0 through Block 4 may contain a plurality of hash buckets. For example, Block 0 may contain buckets B0-B2. In some embodiments, hash buckets may not span multiple blocks such that part of a bucket is stored in a first block while another part is stored in a second block. The buckets may be stored in their entirety within a single block.

Logical blocks containing hash buckets may be written to or read from persistent storage, such as SSD 0 and SSD 1. In an embodiment, logical blocks may be stored across multiple devices, such as Block 2. If a device fails, a portion of that block may be lost and the buckets it contains may be unavailable. The present disclosure discusses a process for handling these and other failures.

FIG. 10 depicts a process for handling block errors. Block errors may occur, for example, if an SSD is removed from the system. If a block is contained partially or entirely on the removed device, it may become unavailable for processing. Additionally or alternatively, storage modules within the SSD may wear as they are used. Eventually, these modules may no longer be able to store the data. If a data block is written to the worn module, a write error may be result. The process depicted in FIG. 10 may help resolve these errors.

At block 1000, a determination is made to flush a cache buffer to a cache index. This cache buffer could be an IO buffer containing a plurality of logical data blocks. For example, when an in-memory index is merged into a cache index, the buckets may be inserted into logical data blocks and stored in an IO buffer. The logical data blocks may then be flushed from the IO buffer to persistent storage. This flush could occur, for example, when the buffer is full, when the buffer reaches/passes/exceeds a threshold, or when the CPU has sufficient bandwidth to process the flush request. In an embodiment, the IO buffer is stored in a memory.

At block 1002, a write for at least one of the logical blocks is initiated. This could be, for example, a full block in the IO buffer that is ready to be flushed to persistent storage. In an embodiment, a block is full when it contains all of the hash buckets to be stored in that block. For example, logical Block 0 may be full when it contains hash buckets B0-B2. In an embodiment, the write request for the logical block may be issued to the persistent storage, such as SSD 0.

At block 1004, an error may be received in response to the write. The error could be received, for example, from the SSD. The error may be the result of a missing SSD, a worn storage module, or any other issue making the SSD unsuitable for storing the logical block.

At block 1006, the received error may be stored in memory on the deduplicated storage system. In some embodiments, the process may continue without storing the block that caused the error. In such an embodiment, the hash buckets stored within that block may be lost.

At block 1008, a read request may be received for the lost logical block. This read request could be, for example, part of a cache lookup and/or a subsequent data merge. Prior to processing the read request and/or issuing it to the SSD, the deduplicated data system may first check its memory for any stored write errors.

At 1010, the error for the previous write request may be identified in memory. For example, an index containing a block/error association may be stored in memory. A lookup for the requested block in this index may identify the error.

Finally, at block 1012, a read error may be returned in response to identifying the missing block. This read error may be returned without issuing the read request to the SSD, allowing the process to continue though a memory check, rather than a storage operation. Upon receiving the read error, the deduplicated storage may treat the error as a cache miss and search for the fingerprint in an authoritative index, such as HDD index 210.

A process similar to FIG. 10 may be used to record failed blocks while reading data. In some embodiments, a device will record each failed read for a given block. If a threshold is exceed, that device may be marked as "failed" and unable service read or write requests, even if there are still operational blocks on the device. This may require the device to be replaced prematurely.

In order to prevent a multitude of reads from failing at the device level, read errors may be recorded in memory similar to write errors. When a read fails, that failure and the associated block may be stored in memory. If a read comes in for that block again, the error may be returned from memory rather than issuing the read to the device.

Figure 13:
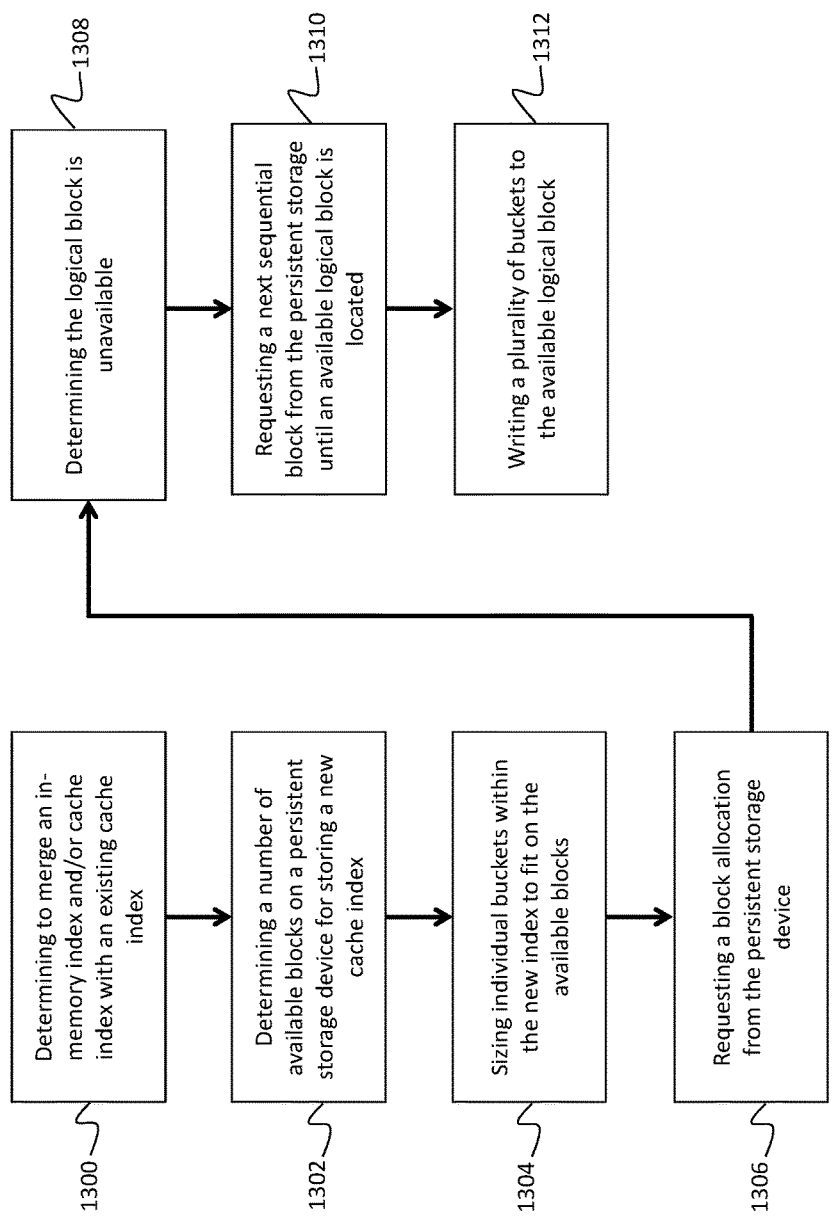
FIG. 13 depicts a process for handling block errors consistent with an embodiment of the present disclosure.

Turning now to FIGS. 11-13, an additional or alternative mechanism for processing block errors in a cache index is discussed.

Figure 11A:
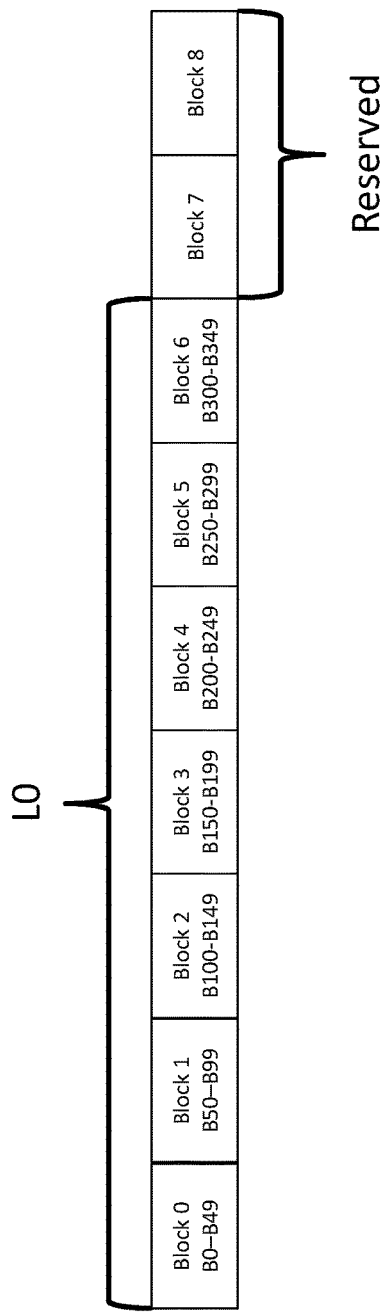
FIG. 11A depicts an index cache written to data blocks consistent with an embodiment of the present disclosure.
Figure 11B:
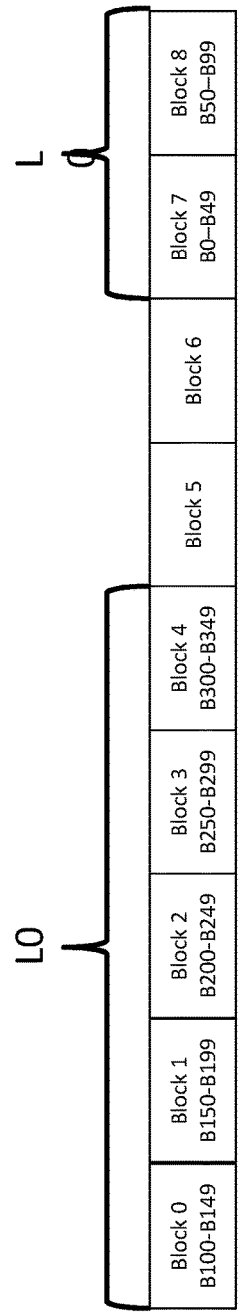
FIG. 11B depicts an updated index cache written to data blocks consistent with an embodiment of the present disclosure.

FIG. 11A and FIG. 11B depict a process for writing blocks comprising a cache index to persistent storage in an operational system. FIG. 11A depicts an L0 cache index, which comprises buckets B0-B349 stored within Block 0 through Block 6. In an embodiment, Block 0 through Block 6 may be stored on a plurality of persistent storage devices, such as a plurality of SSDs. FIG. 11A also depicts reserve blocks: Block 7 and Block 8, which do not contain buckets.

During a merge process, new buckets B0-B349 containing updated data may be written to the SSD. Reserve Block 7 and Block 8 may accommodate this process. When new buckets B0-B49 are received from the HDD, they may be written to Block 7 rather than overwriting Block 0. Once the write to Block 7 is complete, Block 0 may be freed and available for allocation. Similarly, buckets B50-B99 may be written to Block 8 as they arrive, and Block 1 may be freed when the write is complete. When buckets B100-B149 arrive, they may be written to Block 0 as it has been freed and is available. The process may continue in this circular manner until the entire cache index has been written back to disk. FIG. 11B depicts the L0 cache index following the merge, where the index spans Block 7, Block 8, and Blocks 0-4. Block 5 and Block 6 may now be reserve blocks.

FIG. 12A-C depict an embodiment where one of the persistent storage devices, such as an SSD, storing the blocks/buckets has failed. As a result of the failure, Block 0, Block 1, Block 3, and Block 6 may not be unavailable.

FIG. 12A depicts a cache index file, such as an L0 cache index, stored on buckets B0-B349. As a result of an error, however, Block 0, Block 1, Block 3, and Block 6, may not be available. As a result, the data stored in the buckets on those blocks may be lost, and a read may result and a cache error and/or miss.

FIG. 12B depicts a result from the standard merge practice. As in FIG. 11B, buckets B0-B49 may be written to Block 7, and buckets B50-B99 may be written to Block 8. When the system attempts to allocate Block 0 for buckets B100-B149, however, Block 0 may be unavailable since it is on a failed device. The system may next attempt to allocate Block 1, which will also fail. Finally, the system may allocate Block 2, which is available, and write the buckets to storage. If there were only two failed blocks, the merge may continue and successfully write all the buckets. Since we have two blocks on reserve, and only two blocks have failed, there may be a sufficient number of blocks to accommodate all of the buckets. In FIG. 12B, however, there are four failed blocks. Continuing the merge will therefore result in data loss as we do not have sufficient space for all the buckets. FIG. 12C depicts a process fixing this issue.

In FIG. 12C, the system may make a check to determine a number of available blocks prior to calculating a bucket size. This could occur, for example, during the HDD to SSD bucket mapping step. If there are unavailable blocks, such as the result of a drive failure, the bucket size may be reduced. Reducing a bucket size may enable more buckets to be written to a single block.

For example, the bucket size may be reduced to allow a single block to hold 70 buckets. During the merge process, Block 7 may contain buckets B0-B69 and Block 8 may contain bucket B70-B139. Block 0 and Block 1 may be skipped as they are unavailable, and the process may continue at Block 2. This enables the merge process to write all of the buckets to persistent storage, even though the number of available blocks is reduced.

In some embodiments, the merge process may attempt to allocate a range of blocks in FIG. 12C. For example, rather than attempting to allocate blocks one at a time, the process may try to allocate a plurality of blocks. This may enable an available block to be quickly identified, especially if there are a large number of failed blocks.

Turning now to FIG. 13, a process for handling failed blocks is discussed. In an embodiment, the process may handle block failures as discussed at least in reference to FIG. 12C.

At 1300, a determination is made to merge an in-memory index and/or a cache index with an existing cache index. The merge may result in a new cache index. For example, a determination may be made to merge an in-memory index with an L1 cache index. Additionally or alternatively, the merge may be an L1 index to a L0 index. In some embodiments, the merge may occur a primary storage device, such as an HDD, and the writes for that merge may be intercepted and transmitted to a secondary storage device, such as an SSD.

At block 1302, the number of blocks available on a persistent storage for the new cache may be determined. Blocks may be spread over multiple persistent storage devices, such as SSDs. If an SSD becomes unavailable, the blocks stored on that device will also be unavailable. The system may query the devices, drivers, and/or an API to determine if any SSDs are unavailable. Similarly, the system may determine how many blocks are available on the available SSDs.

At 1304, individual buckets within the new cache may be sized to enable all the buckets to fit across the available blocks. For example, a previous index may comprise one million, 16 kb buckets spread over 500 blocks. A device failure, however, may result in only 250 available blocks for the next merge. The one million buckets may be resized to 8 kb, and therefore may be able to fit on the available blocks. While this may result in some data loss within the buckets themselves, that loss may be acceptable as this is a cache index rather than an authoritative index. Further, resizing the buckets maintains the HDD to SSD bucket mapping discussed above.

At 1306, the system may begin writing the new cache index to persistent storage. A block allocation may be requested from the storage, where the block allocation is a logical block for writing buckets within the cache index. For example, in FIG. 12C the block allocation may be for Block 7 as it is a free and available block. Once block 7 has been written, the system may request a next block allocation and receive Block 8. This may continue until Block 0 is requested as it is unavailable.

At 1308, a determination may be made that a requested logical block is unavailable. For example, that block may be stored on a failed and/or removed storage device. In FIG. 12C, the unavailable block may be Block 0, Block 1, Block 3, and/or Block 6.

At 1310, a next sequential block may be requested until an available block is located. For example, the system may request Block 1 and determine it is also unavailable. The system may then request Block 2, which is available. In some embodiments, these blocks may be requested in ranges rather than individually. For example, if a system contains 500 blocks, block allocation requests may include a request for 10 blocks rather than 1. This may enable a free and available block to be quickly located.

Finally, at block 1312, the buckets may be written to the available logical block. In some embodiments, this may involve writing the resized buckets to the logical block. As a result, the block may now contain more buckets than it had in the past. For example, in FIG. 12A each block contains 50 buckets. In FIG. 12C following the merge, however, each block contains 70 buckets. This enables all of the buckets of the cache index to be written to storage, even when the blocks have become unavailable.

Figure 14:
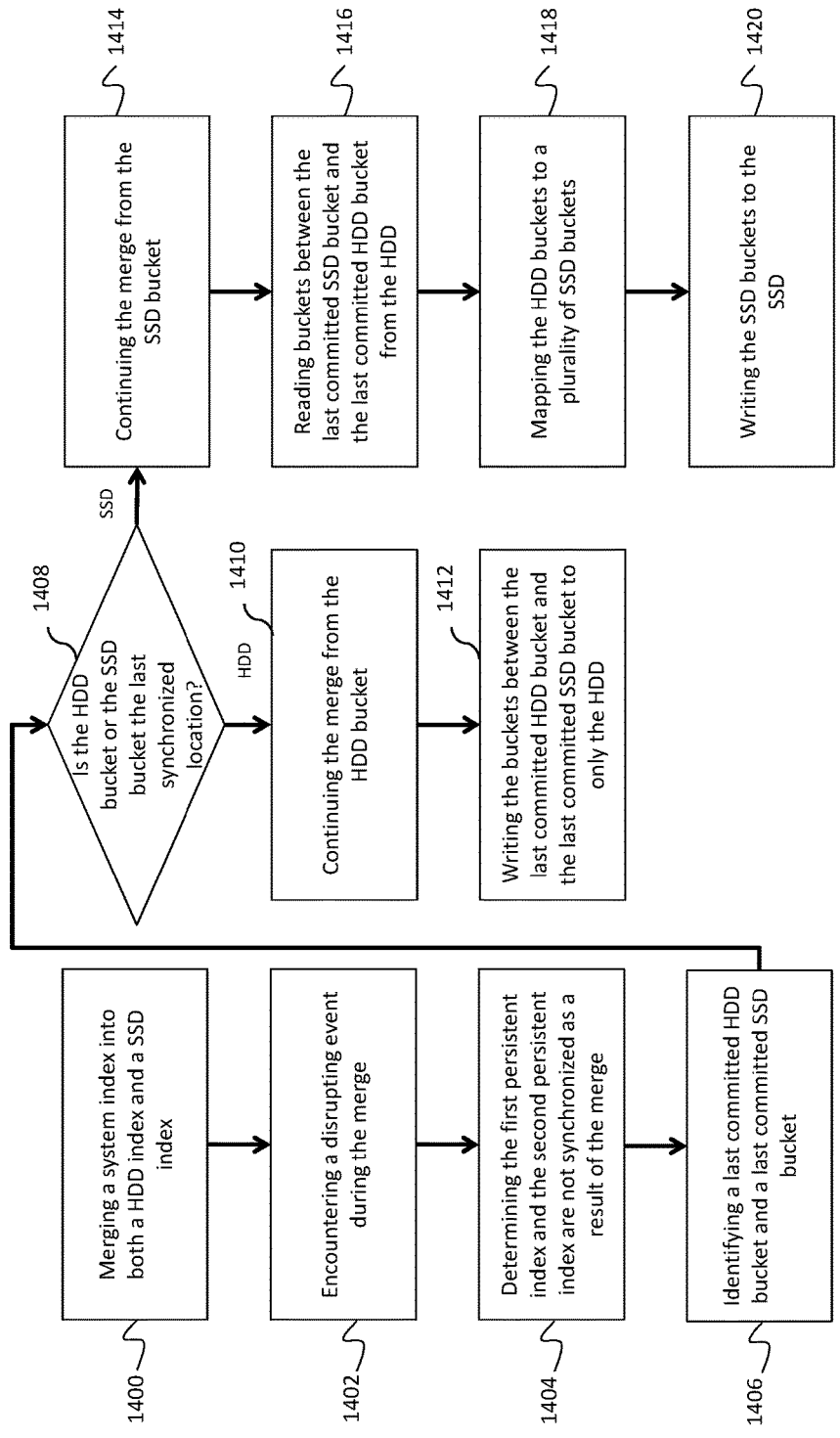
FIG. 14 depicts a process for synchronizing an index and a cache index consistent with an embodiment of the present disclosure.

Turning now to FIG. 14, a method for recovering indexes is discussed. As discussed above, duplicated storage systems may have multiple indexes. One may be an authoritative index and may be stored on low cost hardware, such as an HDD. The other may serve as a higher efficiency cache index and may be stored on high performance media, such as an SSD. Periodically, an in-memory index may be merged into either the cache index or the authoritative index. Similarly, on disk indexes, such as an L0, L1, or L2 index, may periodically be merged together.

This merge process may involve writing data blocks and/or buckets to persistent storage. In some embodiments, however, the authoritative index and the cache index may be written at different points due to media or other constraints. For example, the system may only write full data blocks to disk. If the deduplicated storage system crashes or another disrupting event is encountered during the merge process, these different write points may cause the authoritative index and cache index to be out of sync. One index may contain buckets that the other index has not yet committed to persistent storage. The process shown in FIG. 16 addresses this concern.

At block 1400, a system index may be merged into both an SSD index and a HDD index. In an embodiment, the system index may be an in-memory index, such as index 202. Additionally or alternatively, the system index may be an index already stored on the deduplicated storage system, such as an L0, L1, or L2 index. In some embodiments, the SSD index may be a cache index while the HDD index is an authoritative index. This merge may use any of the methods discussed herein.

At 1402, a disrupting event may be encountered during the merge process. For example, the deduplicated storage system may crash as the result of a power, hardware, or other failure during the merge process. In some embodiments, this may result in inconsistencies between the authoritative index and the cache index.

For example, suppose a L1 index is being merged into a L0 index on an HDD. To maintain consistency, the L1 cache index and L0 cache index may also be updated on an SSD, as discussed above. This could involve mapping buckets from the L0 and/or L1 index to the L0 and/or L1 cache index. In some embodiments, blocks for the authoritative index and cache index may be two different sizes, but each index may only commit the blocks when they are full of their buckets. For example, blocks written to a HDD may be larger than blocks written to an SSD. If the disrupting event terminates the merge after a SSD block is committed, but before the HDD block is committed, the indexes may be out of sync because the SSD contains buckets the HDD does not. Conversely, if the disrupting event terminates the merge process after a HDD block is committed, but before the next SSD block is committed, the indexes may be out of sync as the HDD contains buckets the SSD does not.

At block 1404, the deduplicated storage system may determine that the indexes are out of sync. For example, the system may query both the HDD and the SSD to determine the last committed bucket. If the buckets are the same, the disrupting event did not result in a de-synchronization and the process may continue. If the buckets are different, the indexes are not synchronized and one of them needs to be repaired.

At 1406, a last committed HDD bucket and a last committed SSD bucket may be identified. This may enable the system to determine whether or not the indexes are synchronized. In the event the indexes are not synchronized, the HDD bucket and SSD bucket may identify a starting place for a restore.

At block 1408, a check is made to determine if the HDD bucket or the SSD bucket is the last synchronized location. In an embodiment, the last synchronized location is the last bucket committed to both the HDD and the SSD. If there are multiple SSD buckets mapped to a single HDD bucket, all of the mapped SSD buckets must be committed to the SSD for the SSD to be synchronized with the HDD. If the HDD bucket is at the location, it may mean the SSD contains buckets that the HDD does not because the last committed SSD bucket is further into the merge. The merge process may then continue to step 1410 to bring the HDD into sync with the SSD. Similarly, if the SSD bucket is the last synchronized location, the HDD may contain buckets the SSD does not since the HDD is further in the merge, and the process may continue to block 1414.

At 1410, the merge may continue from the HDD bucket since that is the last synchronized location. For example, HDD buckets from both an L0 and an L1 index may be read and their contents may be merged in memory. This may be substantially similar to the merge process discussed above, except the process is starting the middle rather than the beginning.

At block 1412, the buckets between the last committed HDD bucket and the last committed SSD bucket may be written back to the HDD. For example, the buckets merged at block 1410 may be written to the L0 index. These buckets may not, however, be transferred to the SSD as would normally occur during the merge process. Since the SSD index already contains the buckets, they do not need to be transmitted and written a second time.

If the SSD index is behind the HDD index, the process may continue from block 1408 to block 1414. At block 1414, the merge process may be continued from the SSD bucket since the SSD index is behind the HDD index.

At block 1416, the missing buckets may be read from the HDD. For example, the buckets that have already been committed to the L0 cache may be read, starting at the synchronization point, into memory.

At block 1418, the read HDD buckets may be mapped to a plurality of SSD buckets, as discussed above. The last synchronization point may be identified in the mapped SSD buckets, and the process may begin writing those buckets to the SSD at block 1420.

Once the indexes are synchronized, either after block 1412 or 1420, the merge process may resume as though the disrupting event never occurred.

Figure 15:
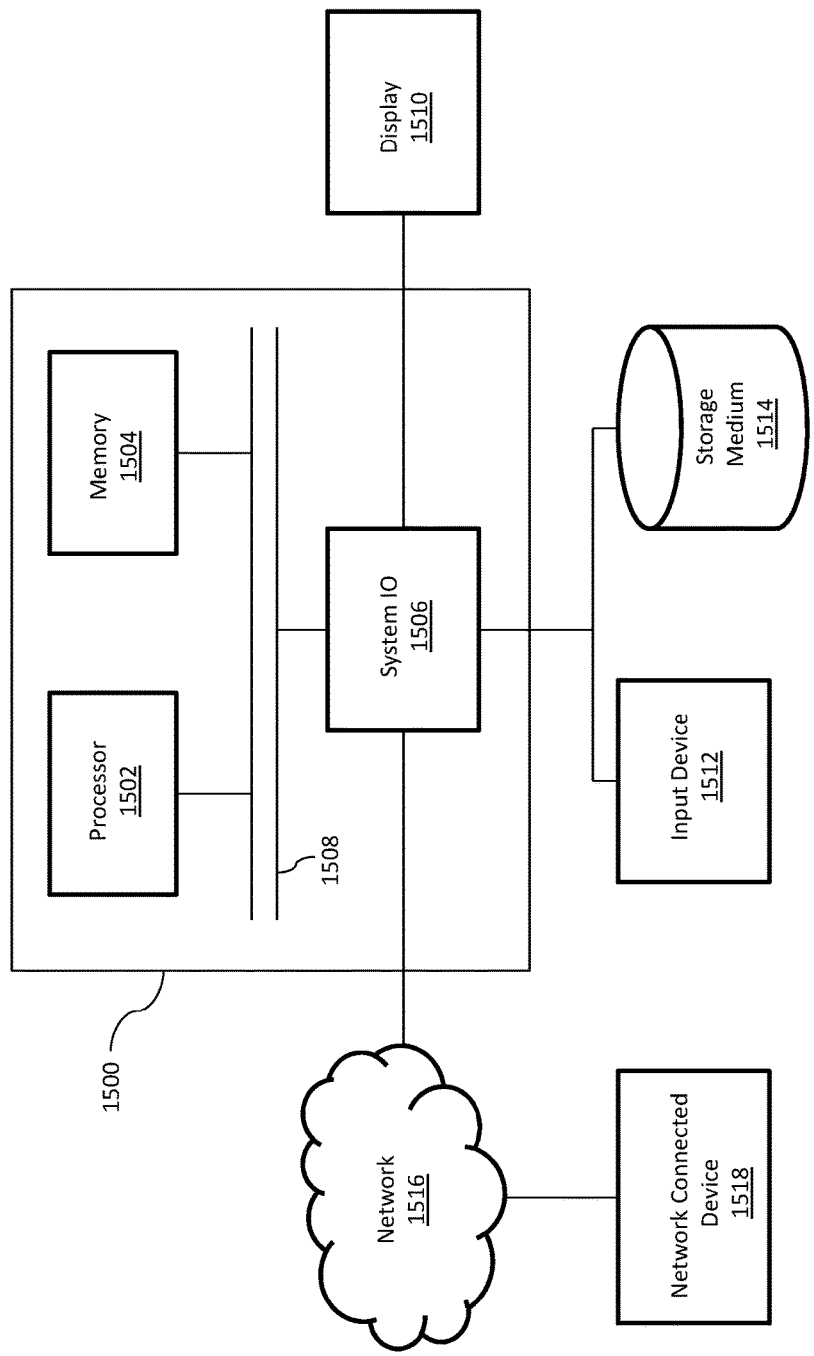
FIG. 15 depicts a general purpose computer system consistent with an embodiment of the present disclosure.

FIG. 15 depicts a computer system which may be used to implement different embodiments discussed herein. General-purpose computer 1500 may include processor 1502, memory 1504, and system IO controller 1506, all of which may be in communication over system bus 1508. In an embodiment, processor 1502 may be a central processing unit ("CPU") or accelerated processing unit ("APU"). Some embodiments may comprise multiple processors, or a processor with multiple cores. Processor 1502 and memory 1504 may together execute a computer process, such as the processes described herein.

System IO controller 1506 may be in communication with display 1510, input device 1512, non-transitory computer readable storage medium 1514, and/or network 1516. Display 1510 may be any computer display, such as a monitor, a smart phone screen, or wearable electronics and/or it may be an input device such as a touch screen. Input device 1512 may be a keyboard, mouse, track-pad, camera, microphone, or the like, and storage medium 1514 may comprise a hard drive, flash drive, solid state drive, magnetic tape, magnetic disk, optical disk, or any other computer readable and/or writable medium. Storage device 1514 may also reside inside general purpose computer 1500, rather than outside as shown in FIG. 1.

Network 1516 may be any computer network, such as a local area network ("LAN"), wide area network ("WAN") such as the internet, a corporate intranet, a metropolitan area network ("MAN"), a storage area network ("SAN"), a cellular network, a personal area network (PAN), or any combination thereof. Further, network 1516 may be either wired or wireless or any combination thereof, and may provide input to or receive output from IO controller 1506. In an embodiment, network 1516 may be in communication with one or more network connected devices 1518, such as another general purpose computer, smart phone, PDA, storage device, tablet computer, or any other device capable of connecting to a network.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for maintaining an index on a deduplicated storage system, the method comprising:
    determining device failure within a persistent storage device that results in only a second number of blocks being available, wherein prior to the device failure, a first number of blocks were available, the first number being greater than the second number, and data comprising a third number of buckets of a first individual bucket size were stored on the first number of blocks, and wherein the blocks are spread over a plurality of persistent storage devices of the deduplicated storage system, and wherein failure of one of the plurality of persistent storage devices causes blocks stored on the one of the plurality of persistent storage devices to become unavailable;
    determining whether there are more failed blocks than there are blocks on reserve;
    in response to determining that there are more failed blocks than there are blocks on reserve, performing bucket resizing operations to reduce an individual bucket size to enable more buckets to be written to a single block, the bucket resizing operations comprising:
    determining a second individual bucket size for the third number of buckets, wherein the third number of buckets of the second individual bucket size fit on the second number of blocks, the second individual bucket size being smaller than the first individual bucket size;
    requesting a block allocation from the persistent storage device, wherein the block allocation comprises a logical block for storing data;
    determining the logical block is unavailable due to the device failure;
    requesting a next sequential block from the persistent storage until an available logical block is located, the available logical block satisfying the block allocation; and
    writing data comprising a plurality of buckets of the second individual bucket size to the available logical block, each of the plurality of buckets storing a value comprising a fingerprint and a container identifier, wherein the buckets form the index, the index being stored in a memory of the deduplicated storage system.

2. The method of claim 1, wherein requesting the next sequential block comprises requesting a block range comprising a plurality of logical blocks.

3. A system for maintaining an index on a deduplicated storage system, the system comprising a non-transitory computer readable medium and processor enabled to execute instructions for:
    determining device failure within a persistent storage device that results in only a second number of blocks being available, wherein prior to the device failure, a first number of blocks were available, the first number being greater than the second number, and data comprising a third number of buckets of a first individual bucket size were stored on the first number of blocks, and wherein the blocks are spread over a plurality of persistent storage devices of the deduplicated storage system, and wherein failure of one of the plurality of persistent storage devices causes blocks stored on the one of the plurality of persistent storage devices to become unavailable;
    determining whether there are more failed blocks than there are blocks on reserve;
    in response to determining that there are more failed blocks than there are blocks on reserve, performing bucket resizing operations to reduce an individual bucket size to enable more buckets to be written to a single block, the bucket resizing operations comprising:
    determining a second individual bucket size for the third number of buckets, wherein the third number of buckets of the second individual bucket size fit on the second number of blocks, the second individual bucket size being smaller than the first individual bucket size;

requesting a block allocation from the persistent storage device, wherein the block allocation comprises a logical block for storing data;

determining the logical block is unavailable due to the device failure;

requesting a next sequential block from the persistent storage until an available logical block is located, the available logical block satisfying the block allocation; and writing data comprising a plurality of buckets of the second individual bucket size to the available logical block, each of the plurality of buckets storing a value comprising a fingerprint and a container identifier, wherein the buckets form the index, the index being stored in a memory of the deduplicated storage system.

4. The system of claim 3, wherein requesting the next sequential block comprises requesting a block range comprising a plurality of logical blocks.

5. A non-transitory computer readable storage medium comprising processor instructions for maintaining an index on a deduplicated storage system, the instructions comprising:

determining device failure within a persistent storage device that results in only a second number of blocks being available, wherein prior to the device failure, a first number of blocks were available, the first number being greater than the second number, and data comprising a third number of buckets of a first individual bucket size were stored on the first number of blocks, and wherein the blocks are spread over a plurality of persistent storage devices of the deduplicated storage system, and wherein failure of one of the plurality of persistent storage devices causes blocks stored on the one of the plurality of persistent storage devices to become unavailable;

determining whether there are more failed blocks than there are blocks on reserve;

in response to determining that there are more failed blocks than there are blocks on reserve, performing bucket resizing operations to reduce an individual bucket size to enable more buckets to be written to a single block, the bucket resizing operations comprising:

determining a second individual bucket size for the third number of buckets, wherein the third number of buckets of the second individual bucket size fit on the second number of blocks, the second individual bucket size being smaller than the first individual bucket size;

requesting a block allocation from the persistent storage device, wherein the block allocation comprises a logical block for storing data;

determining the logical block is unavailable due to the device failure;

requesting a next sequential block from the persistent storage until an available logical block is located, the available logical block satisfying the block allocation; and writing data comprising a plurality of buckets of the second individual bucket size to the available logical block, each of the plurality of buckets storing a value comprising a fingerprint and a container identifier, wherein the buckets form the index, the index being stored in a memory of the deduplicated storage system.

6. The computer readable storage medium of claim 5, wherein requesting the next sequential block comprises requesting a block range comprising a plurality of logical blocks.

* * * * *